(12) United States Patent
Nanai et al.

(10) Patent No.: US 11,552,581 B2
(45) Date of Patent: Jan. 10, 2023

(54) BOARD AND ELECTRONIC APPARATUS INCLUDING BOARD

(71) Applicant: CANON KABUSHIKI KAISHA, Tokyo (JP)

(72) Inventors: Ryosuke Nanai, Tokyo (JP); Mitsuhiro Sugeta, Chiba (JP); Hiroki Hirata, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 17/196,238

(22) Filed: Mar. 9, 2021

(65) Prior Publication Data

US 2021/0288596 A1 Sep. 16, 2021

(30) Foreign Application Priority Data

Mar. 12, 2020 (JP) .............................. JP2020-043456

(51) Int. Cl.
*H02P 5/00* (2016.01)
*H02P 5/68* (2006.01)
*B41J 23/00* (2006.01)
*H02P 7/03* (2016.01)

(52) U.S. Cl.
CPC ............... *H02P 5/68* (2013.01); *B41J 23/00* (2013.01); *H02P 7/04* (2016.02)

(58) Field of Classification Search
CPC ...... H02P 7/04; H02P 7/00; H02P 8/00; H02P 5/68

USPC .......................................................... 318/112
See application file for complete search history.

(56) References Cited

U.S. PATENT DOCUMENTS

| 9,844,132 | B2 | 12/2017 | Serizawa | |
|---|---|---|---|---|
| 2018/0351490 | A1* | 12/2018 | Sugamoto | ................. H02P 8/34 |
| 2018/0357197 | A1* | 12/2018 | Morone | ................. F02D 41/26 |
| 2019/0260316 | A1* | 8/2019 | Noie | ......................... H02P 7/04 |
| 2021/0099116 | A1* | 4/2021 | Krishnamurthy | ........ H03K 5/24 |

FOREIGN PATENT DOCUMENTS

| CN | 102350877 A | 2/2012 |
|---|---|---|
| JP | 2009-176785 A | 8/2009 |

\* cited by examiner

*Primary Examiner* — Kawing Chan
*Assistant Examiner* — Gabriel Agared
(74) *Attorney, Agent, or Firm* — Canon U.S.A., Inc. I.P. Division (57) ABSTRACT

A board includes a first motor driver control circuit, a first connector, and a second connector. The first motor driver control circuit includes a first H-bridge and a second H-bridge. The first connector includes at least the following: a first pin to which a first output of the first H-bridge is input, a second pin to which a second output of the first H-bridge is input, and a third pin. The second connector is disposed apart from the first connector and includes at least the following: a first pin to which a first output of the second H-bridge is input, a second pin to which a second output of the second H-bridge is input, and a third pin of the second connector.

20 Claims, 9 Drawing Sheets

FIG.1

[COLOR PRINTER]

BOARD AND ELECTRONIC APPARATUS INCLUDING BOARD

BACKGROUND

Field

The present disclosure relates to a board including a motor driver control circuit configured to control an operation of a motor, and an electronic apparatus including the board.

Description of the Related Art

Electronic apparatuses such as printers may employ commonalized driver boards as driver boards that control loads, but be sold as different models after the loads in the apparatuses are partially removed or changed.

For example, a driver board in a color printer and a driver board in a monochrome printer may control different motors from each other (for example, a stepping motor in the color printer and a direct-current (DC) motor in the monochrome printer). If the motor driver board in the color printer and the motor driver board in the monochrome printer are manufactured individually differently, this undesirably leads to a cost increase. For this reason, it is required to control the motor in the color printer and the motor in the monochrome printer by the commonalized boards. Japanese Patent Application Laid-Open No. 2009-176785 proposes an engine board with the number of ports, a wiring structure, and the like being devised so that the engine board can be connected to both a main board of a color printer and a main board of a monochrome printer.

Japanese Patent Application Laid-Open No. 2009-176785 discusses the following technique.

Figure 7A:
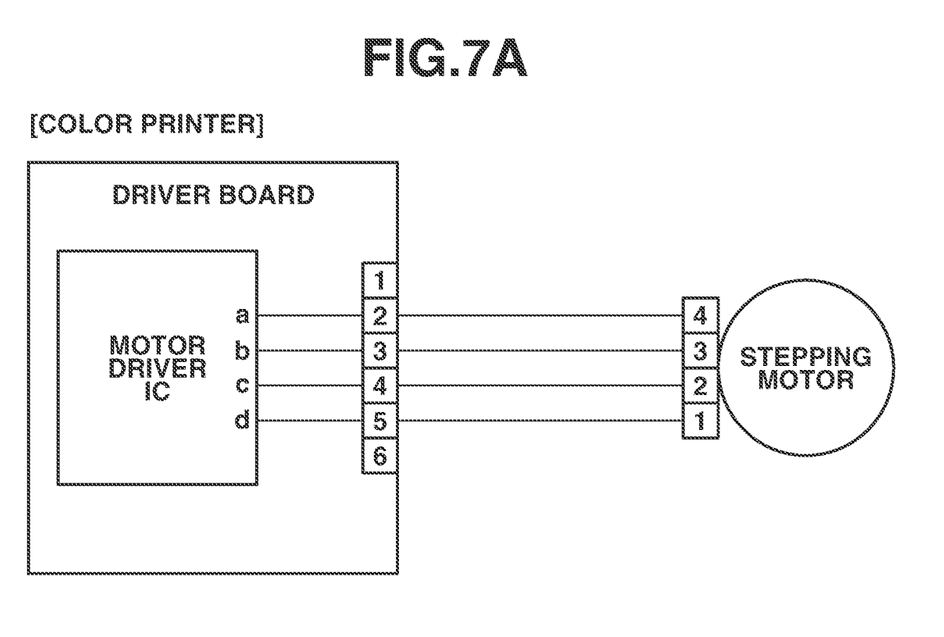
FIG. 7A illustrates a driver board installed in a conventional color printer.

As illustrated in FIG. 7A, a motor driver integrated circuit (IC) of a driver board in a color printer controls a stepping motor. The motor driver IC includes not-illustrated two H-bridge circuits, and the H-bridge circuits have two outputs for each of them, i.e., have four outputs in total (a, b, c, and d).

As further illustrated in FIG. 7A, in the color printer, the output a is input to a pin 4 of a connector of the stepping motor via a pin 2 of a connector, and the output b is input to a pin 3 of the connector of the stepping motor via a pin 3 of the connector. The output c is input to a pin 2 of the connector of the stepping motor via a pin 4 of the connector, and the output d is input to a pin 1 of the connector of the stepping motor via a pin 5 of the connector.

SUMMARY

Figure 7B:
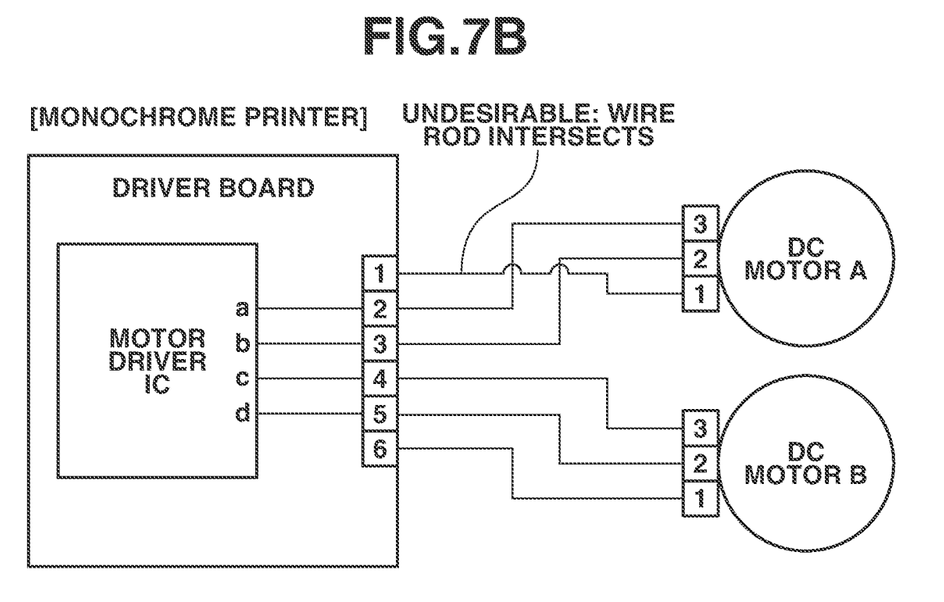
FIG. 7B illustrates a driver board installed in a conventional monochrome printer.

As illustrated in FIG. 7B, the same driver board of the color printer illustrated in FIG. 7A is employed for a monochrome printer, and the motor driver IC controls two DC motors. In the monochrome printer, the output a is input to a pin 3 of a connector of a DC motor A via the pin 2 of the connector, and the output b is input to a pin 2 of the connector of the DC motor A via the pin 3 of the connector. The output c is input to a pin 3 of a connector of a DC motor B via the pin 4 of the connector, and the output d is input to a pin 2 of the connector of the DC motor B via the pin 5 of the connector. A LOCK pin 1 of the DC motor A is connected to a pin 1 of the connector, and a LOCK pin 1 of the DC motor B is connected to a pin 6 of the connector.

The illustrated layout, however, undesirably creates an unusual wire harness in which the wire rod connected to the pin 1 of the connector and the LOCK pin 1 of the DC motor A intersects with another wire rod.

Figure 8A:
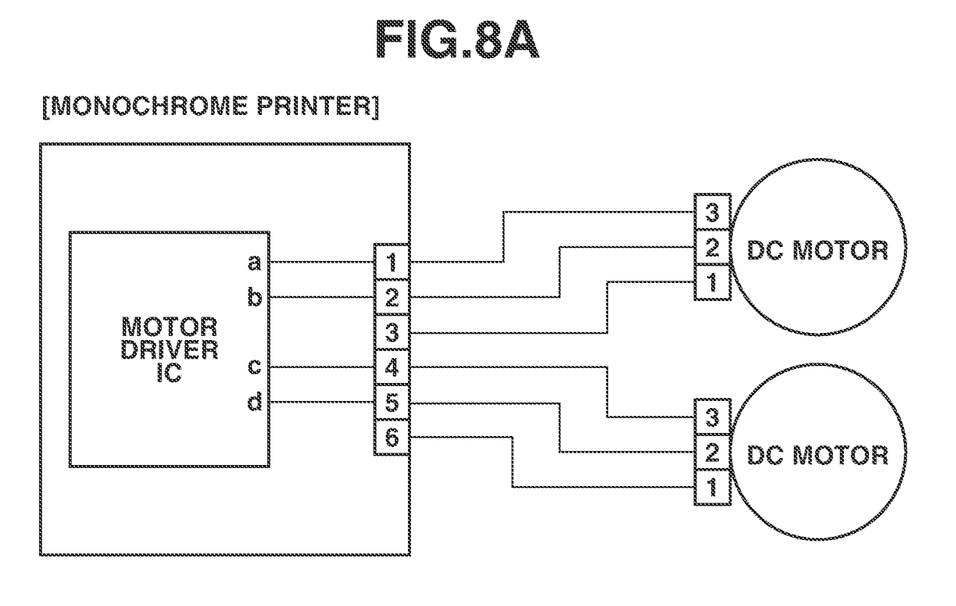
FIG. 8A illustrates the driver board installed in the conventional monochrome printer.

On the other hand, one possible method to avoid the creation of an unusual wire harness is a connection like the example illustrated in FIG. 8A. More specifically, in the monochrome printer, the output a is input to the pin 3 of the connector of the DC motor A via the pin 1 of the connector, and the output b is input to the pin 2 of the connector of the DC motor A via the pin 2 of the connector. The output c is input to the pin 3 of the connector of the DC motor B via the pin 4 of the connector, and the output d is input to the pin 2 of the connector of the DC motor B via the pin 5 of the connector. The LOCK pin 1 of the DC motor A is connected to the pin 3 of the connector, and the LOCK pin 1 of the DC motor B is connected to the pin 6 of the connector. Establishing the connection in this manner prevents wire rods from intersecting with each other, thereby succeeding in avoiding the creation of an unusual wire harness.

Figure 8B:
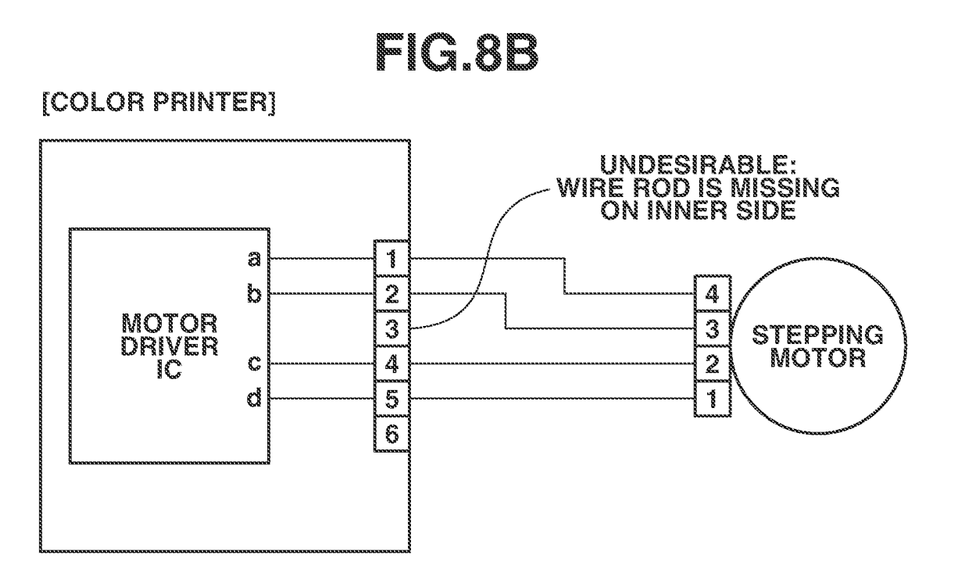
FIG. 8B illustrates the driver board installed in the conventional color printer.

In the case where the motor driver IC and the connector are connected as illustrated in FIG. 8A, however, a connection is established in the color printer as illustrated in FIG. 8B. More specifically, the output a is input to the pin 4 of the connector of the stepping motor via the pin 1 of the connector, and the output b is input to the pin 3 of the connector of the stepping motor via the pin 2 of the connector. The output c is input to the pin 2 of the connector of the stepping motor via the pin 4 of the connector, and the output d is input to the pin 1 of the connector of the stepping motor via the pin 5 of the connector.

Connecting the motor driver IC and the stepping motor in this manner brings about an internally empty state in which no wire rod is connected to the pin 3 of the connector. The internally empty state weakens the engagement between the wire rod and the connector, thereby undesirably facilitating the detachment of the wire rod from the connector.

The present disclosure is directed to providing a board without a wire rod intersecting with other wire rods or missing in the middle and configured to control different types of motors.

According to an aspect of the present disclosure, a board having a first motor driver control circuit including a first H-bridge and a second H-bridge, a first connector including at least the following: a first pin to which a first output of the first H-bridge is input, a second pin to which a second output of the first H-bridge is input, and a third pin, and a second connector disposed apart from the first connector and including at least the following: a first pin to which a first output of the second H-bridge is input, a second pin to which a second output of the second H-bridge is input, and a third pin of the second connector.

Further features of the present disclosure will become apparent from the following description of exemplary embodiments with reference to the attached drawings.

DESCRIPTION I/F THE EMBODIMENTS

An exemplary embodiment for implementing the present disclosure will be described with reference to the drawings. The present exemplary embodiment will be described based on an example in which a board according to the present exemplary embodiment is applied to a color printer and a monochrome printer.

Figure 1:
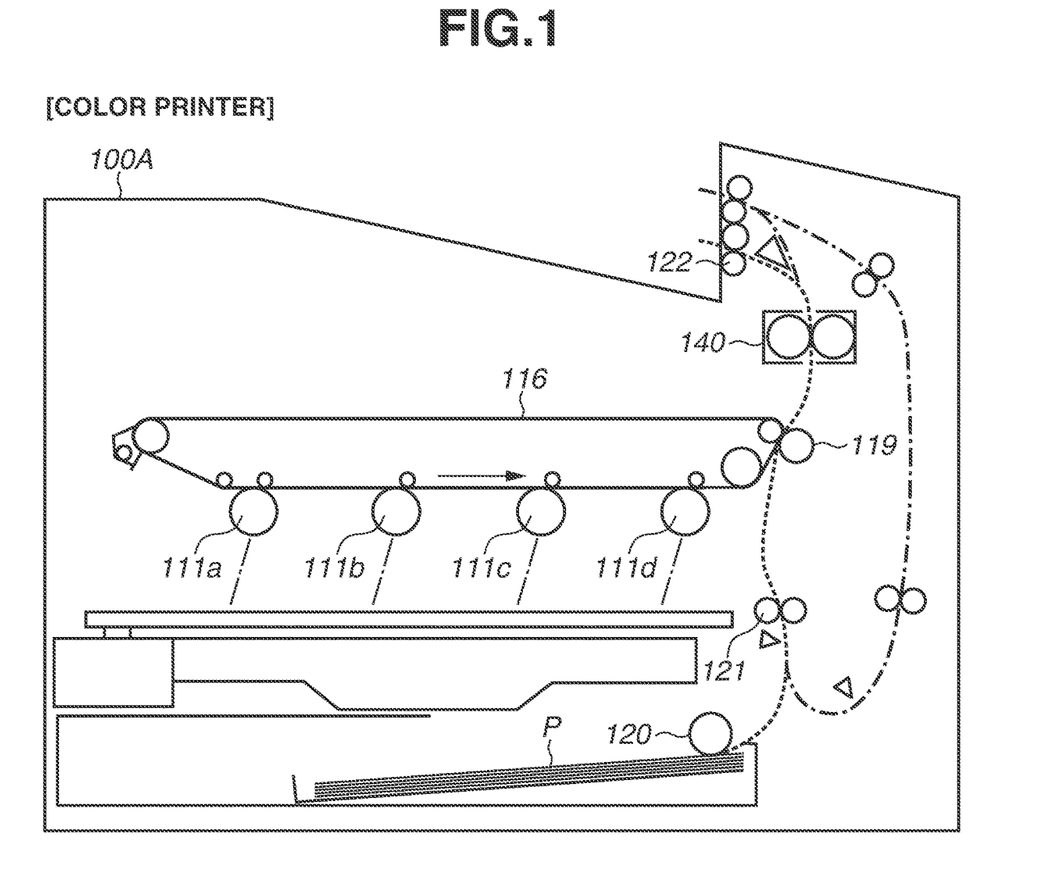
FIG. 1 is a cross-sectional view schematically illustrating the configuration of a color printer.

FIG. 1 is a cross-sectional view schematically illustrating the configuration of a color printer 100A.

In FIG. 1, a recording sheet P stored in a cassette is fed by a sheet feeding roller 120 connected to a not-illustrated sheet feeding motor. The fed recording sheet P passes through a one-sided conveyance path (a broken line in FIG. 1), and is conveyed to a transfer position between an intermediate transfer belt 116 and a secondary transfer external roller 119 via a registration roller 121, which corrects a skew. After passing through the transfer position, the recording sheet P passes through a fixing device 140, which fixes an image on the recording sheet P, and then is discharged out of the color printer 100A by a sheet discharge roller 122 after that.

Process units 111a, 111b, 111c, and 111d correspond to yellow, magenta, cyan, and black, respectively. The process units 111a, 111b, 111c, and 111d include photosensitive drums and development devices.

Figure 2:
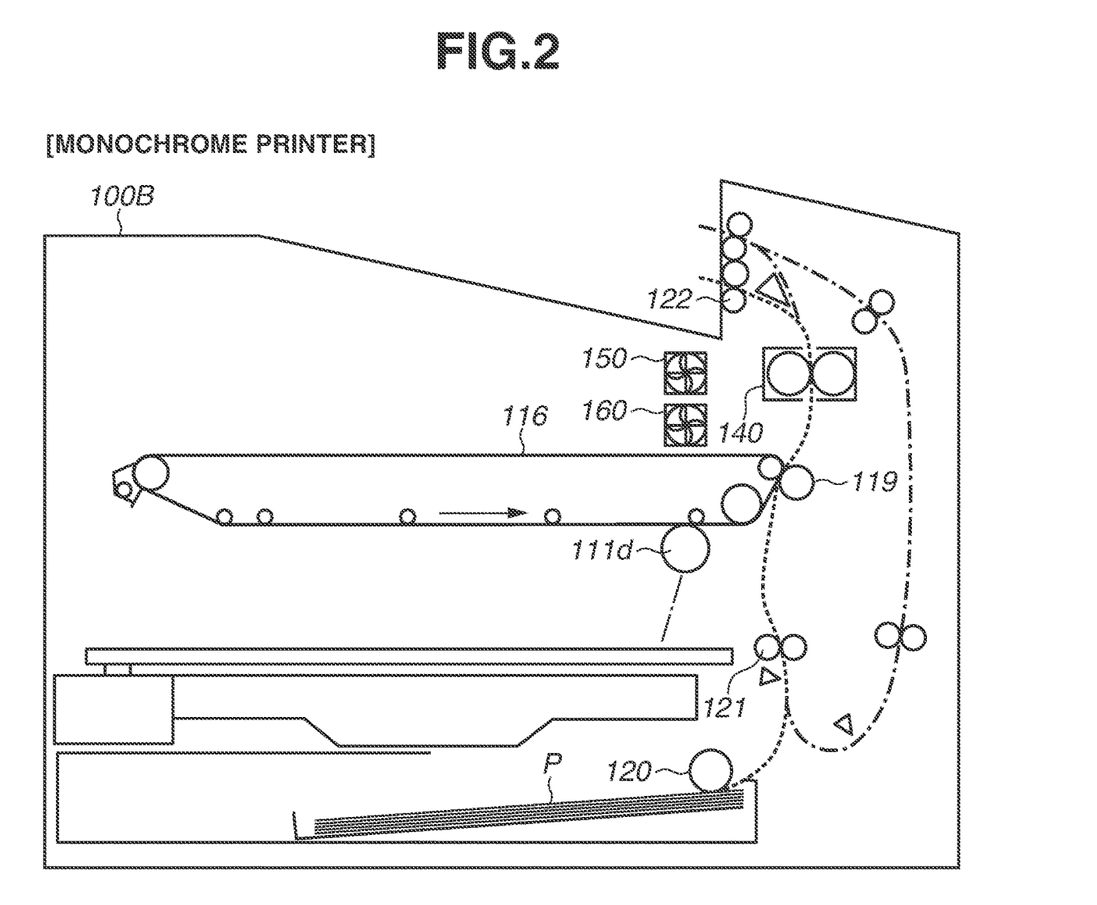
FIG. 2 is a cross-sectional view schematically illustrating the configuration of a monochrome printer.

FIG. 2 is a cross-sectional view schematically illustrating the configuration of a monochrome printer 100B.

The monochrome printer 100B according to the present exemplary embodiment is a machine type in which the components unnecessary for the monochrome printer, such as the process units 111a, 111b, and 111c corresponding to yellow, magenta, and cyan, are omitted from the above-described color printer 100A. The monochrome printer 100B according to the present exemplary embodiment is a printer that carries out printing at a higher speed than the color printer 100A, and causes greater increases in the temperatures of the motor and the fixing device 140 than the color model. For this reason, the monochrome printer 100B includes fan units 150 and 160. The surrounding temperatures of the above-described process units 111a, 111b, 111c, and 111d, and the fixing device 140 affect the image quality and the durability lifetime. Accordingly, the monochrome printer 100B controls the surrounding temperatures of the process unit 111d and the fixing device 140 by using the fan units 150 and 160.

Figure 3:
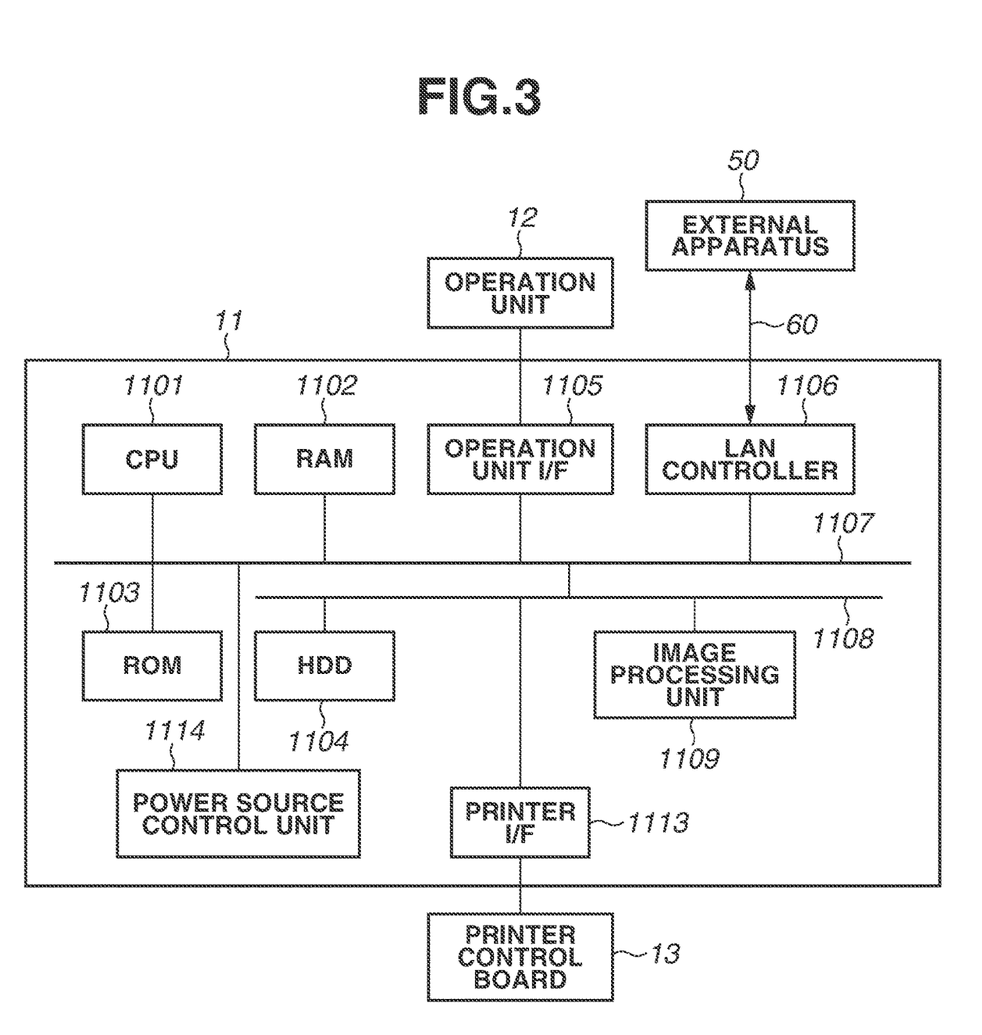
FIG. 3 is a block diagram illustrating a controller.

FIG. 3 is a block diagram illustrating a controller that controls the printer. Details of a controller 11, which controls the printer, will be described with reference to FIG. 3.

As illustrated in FIG. 3, the controller 11 is connected to a printer control board 13 and an operation unit 12. The controller 11 includes a central processing unit (CPU) 1101, a random access memory (RAM) 1102, a read only memory (ROM) 1103, an operation unit interface (I/F) 1105, a local area network (LAN) controller 1106, and a power source control unit 1114. The CPU 1101, the RAM 1102, the ROM 1103, the operation unit I/F 1105, the LAN controller 1106, and the power source control unit 1114 are connected to a system bus 1107. The controller 11 includes a hard disk drive (HDD) 1104, an image processing unit 1109, and a printer I/F 1113. The HDD 1104, the image processing unit 1109, and the printer I/F 1113 are connected to an image bus 1108.

The CPU 1101 comprehensively controls access to various kinds of devices, that are currently connected, based on, for example, a control program stored in the ROM 1103, and also comprehensively controls various kinds of processing performed by the controller 11.

The RAM 1102 is a system work memory that allows the CPU 1101 to operate. The RAM 1102 is also a memory for temporarily storing image data. The RAM 1102 includes a static RAM (SRAM), in which the stored content can be retained even when the controller 11 is powered off, and a dynamic RAM (DRAM), in which the stored content is deleted when the controller 11 is powered off. The ROM 1103 stores a boot program of the apparatus and the like therein. The HDD 1104 is a hard disk drive, and stores a program for controlling the printer and the image data therein.

The operation unit I/F 1105 is an interface unit for connecting the system bus 1107 and the operation unit 12. The operation unit I/F 1105 receives image data to be displayed on the operation unit 12 from the system bus 1107 and outputs the image data to the operation unit 12, and also outputs information input from the operation unit 12 to the system bus 1107.

The LAN controller 1106 controls an input/output of information to/from the printer and an external apparatus 50 connected to a network 60.

The power source control unit 1114 controls power supply to each of the units of the printer.

The image bus 1108 is a transmission path for exchanging the image data, and is formed of a bus such as a Peripheral Component Interconnect (PCI) bus and Institute of Electrical and Electronics Engineers (IEEE) 1394.

The image processing unit 1109 functions to perform image processing, and performs image processing such as reading out the image data stored in the RAM 1102, enlarging or reducing Joint Photographic Experts Group (JPEG) and Joint Bi-level Image Experts Group (JBIG), and a color adjustment.

The printer control board 13 controls the process unit, the fixing device, various kinds of rollers, various kinds of motors, and the like.

Figure 4:
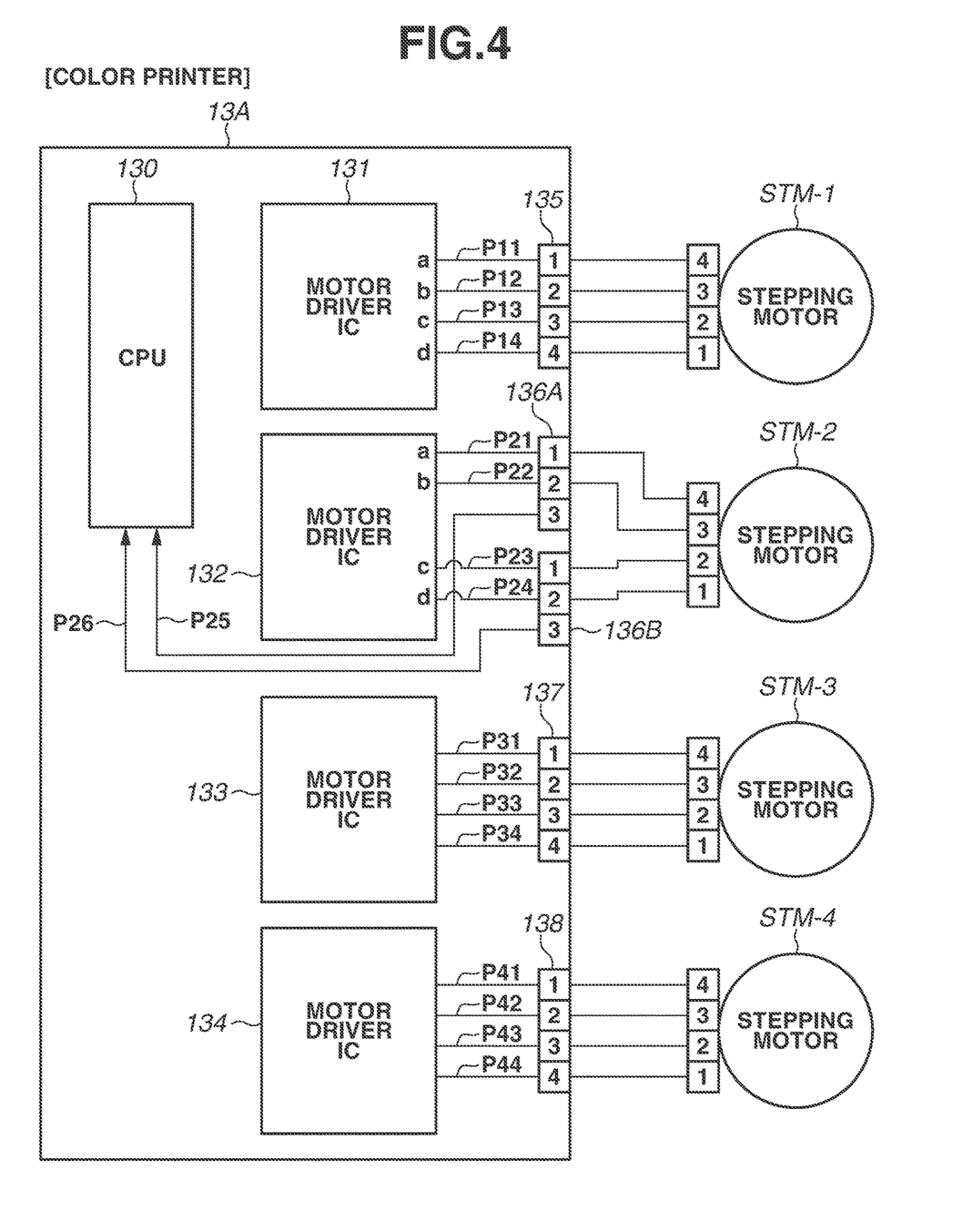
FIG. 4 illustrates details of a printer control board of the color printer.

FIG. 4 illustrates details of a printer control board of the color printer.

The details of the printer control board installed in the color printer 100A will be described with reference to FIG. 4.

The printer control board 13A of the color printer 100A includes a CPU 130, and one or a plurality of motor driver integrated circuits (ICs) (motor driver control circuits), such as motor driver control circuits 131, 132, 133, and 134. The printer control board 13A includes the motor driver ICs 131, 132, 133, and 134, which control stepping motors STM-1, STM-2, STM-3, and STM-4 of the development devices corresponding to the four colors, which are yellow, magenta, cyan, and black. Details of the motor driver ICs 131, 132, 133, and 134 will be described below.

The printer control board 13A includes a connector 135 to which an output a, an output b, an output c, and an output d are input from the motor driver IC 131. The printer control board 13A includes a connector 137 to which an output a, an output b, an output c, and an output d are input from the motor driver IC 133. The printer control board 13A includes a connector 138 to which an output a, an output b, an output c, and an output d are input from the motor driver IC 134. The connectors 135, 137, and 138 are connectors to which four signals can be input.

The printer control board 13A includes a connector 136A to which an output a and an output b are input from the motor driver IC 132, and a connector 136B to which an output c and an output d are input from the motor driver IC 132. The connector 136A and the connector 136B are disposed apart from each other.

A pin 3 of the connector 136A is an empty pin, and a wire rod for a connection to the stepping motor STM-2 is not connected thereto. A pin 3 of the connector 136B is also an empty pin, and a wire rod for a connection to the stepping motor STM-2 is not connected thereto.

A wire P25 connecting the pin 3 of the connector 136A and the CPU (a processor) 130 is formed on the printer control board 13A. A wire P26 connecting the pin 3 of the connector 136B and the CPU 130 is formed on the printer control board 13A. The wires P25 and P26 are formed on the printer control board 13A although the wires P25 and P26 are not used as the color printer 100A. The wires P25 and P26 are used to detect a lock of the motor in the monochrome printer 100B, which will be described below.

Wires P11 to P14, wires P21 to P24, wires P31 to P34, and wires P41 to P44 in FIG. 4 are laid as illustrated in FIG. 4, and therefore the descriptions thereof will be omitted here.

Figure 5:
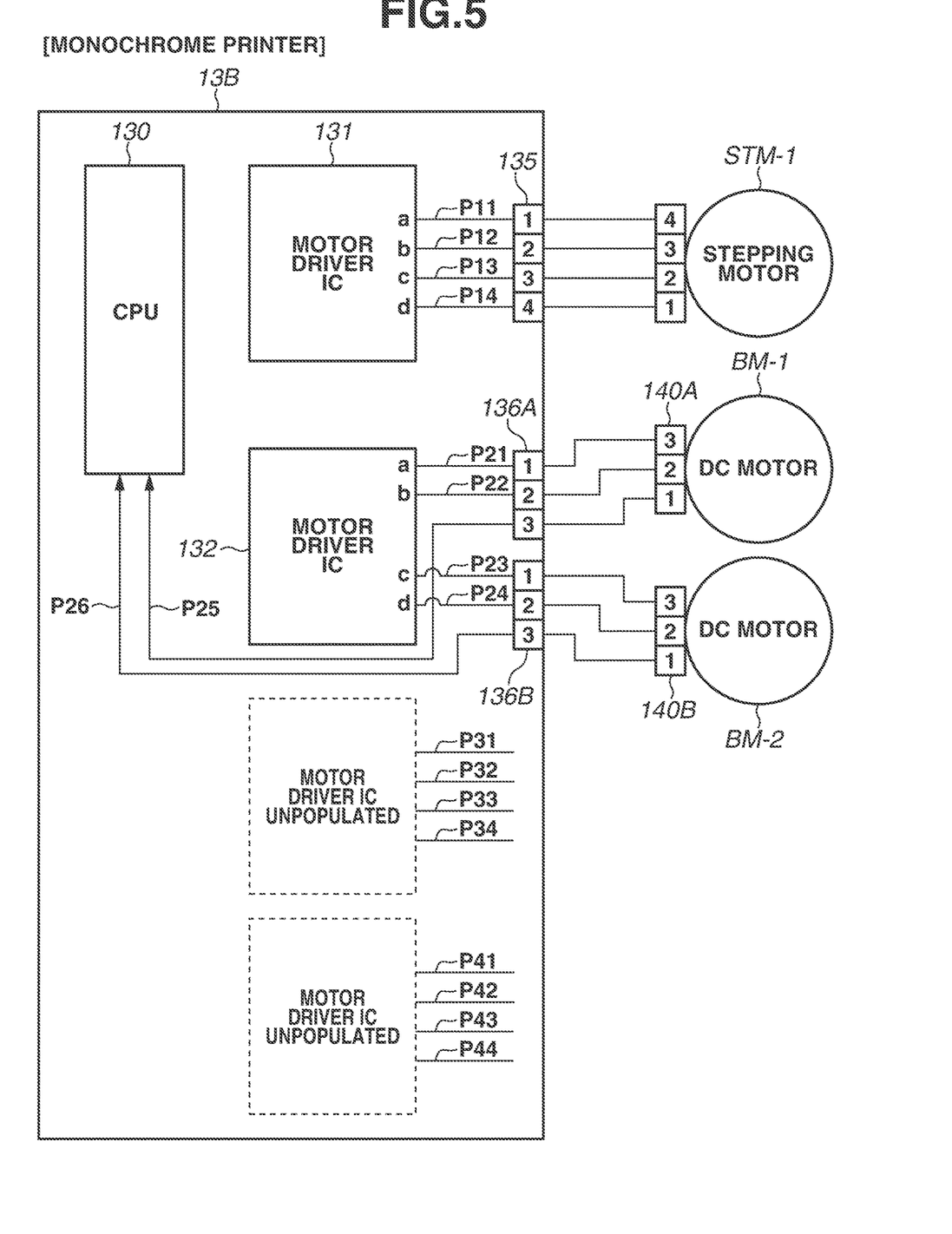
FIG. 5 illustrates details of a printer control board of the monochrome printer.

FIG. 5 illustrates details of a printer control board of the monochrome printer.

Next, details of the printer control board installed in the monochrome printer 100B will be described with reference to FIG. 5. The printer control board 13B installed in the monochrome printer 100B and the printer control board 13A installed in the color printer 100A are commonalized except for the components mounted thereon. More specifically, the motor driver ICs 133 and 134 and the connectors 137 and 138, which are mounted on the printer control board 13A of the color printer 100A, are not mounted on the printer control board 13B installed in the monochrome printer 100B. A motor driver IC, however, can be mounted on the printer control board 13B, and unpopulated regions, the wires P11 to P14, the wires P21 to P26, the wires P31 to P34, and the wires P41 to P44 are provided on the printer control board 13B.

The printer control board 13B of the monochrome printer 100B includes the CPU 130 and the plurality of motor driver ICs 131 and 132. The printer control board 13B includes the motor driver IC 131, which controls the stepping motor STM-1 of the development device corresponding to black. The printer control board 13B includes the motor driver IC 132, which controls two direct-current (DC) motors BM-1 and BM-2. The DC motors BM-1 and BM-2 are motors that drive fans, and are included in the fan units 150 and 160, respectively. The DC motors BM-1 and BM-2 include connectors 140A and 140B each equipped with three pins, respectively. A pin 1 of the connector 140A of the DC motor BM-1 and a pin 1 of the connector 140B of the DC motor BM-2 are each a pin for outputting a lock signal. A pin 3 of the connector 140A of the DC motor BM-1 is connected to the pin 1 of the connector 136A, and a pin 2 of the connector 140A of the DC motor BM-1 is connected to the pin 2 of the connector 136A. A pin 3 of the connector 140B of the DC motor BM-2 is connected to the pin 1 of the connector 136B, and a pin 2 of the connector 140B of the DC motor BM-2 is connected to the pin 2 of the connector 136B. The connector 140A of the DC motor BM-1 and the connector 136A are connected to each other via three wire rods. The connector 140B of the DC motor BM-2 and the connector 136B are connected to each other via three wire rods.

The pin 3 of the connector 136A is connected to the CPU 130 via the wire P25, and the pin 3 of the connector 136B is connected to the CPU 130 via the wire P26. The CPU 130 detects that the DC motor BM-1 is locked based on the signal input via the wire P25. The CPU 130 detects that the DC motor BM-2 is locked based on the signal input via the wire P26. When the DC motor BM-1 is locked, the CPU 130 is notified of the lock signal via the pin 1 of the connector 140A, the pin 3 of the connector 136A, and the wire P25. When the DC motor BM-2 is locked, the CPU 130 is notified of the lock signal via the pin 1 of the connector 140B, the pin 3 of the connector 136B, and the wire P26.

The printer control board 13B includes the connector 135 to which the output a, the output b, the output c, and the output d are input from the motor driver IC 131, similarly to the printer control board 13A. However, the connectors 137 and 138, which are mounted on the printer control board 13A, are not mounted on the printer control board 13B. The motor driver IC 133 and the motor driver IC 134 are not mounted on the printer control board 13B. The wires P31 to P34 and P41 to P44, which will be used when the motor driver IC 133 and the motor driver IC 134 are mounted, are formed on the printer control board 13B.

Figure 6:
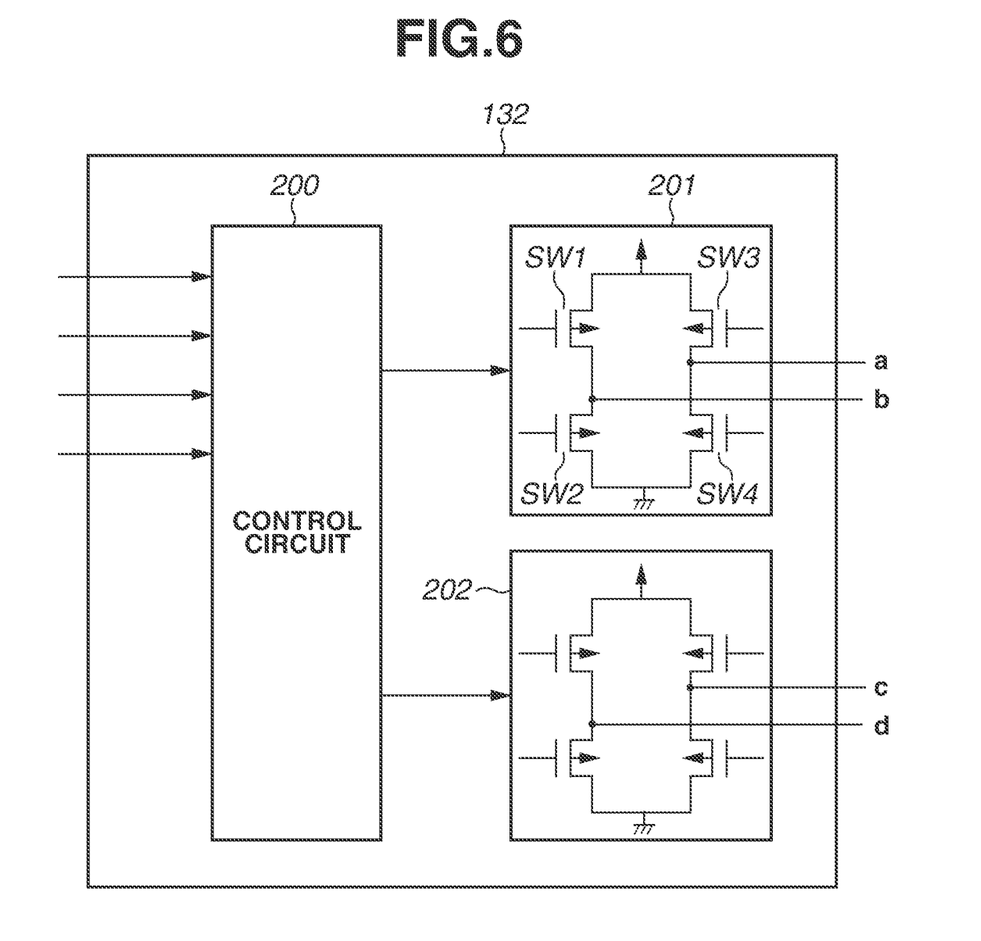
FIG. 6 illustrates details of a motor driver integrated circuit (IC).

FIG. 6 illustrates details of the motor driver IC. The details of the motor driver IC will be described with reference to FIG. 6.

The motor driver IC 132 drives the stepping motor STM-2 in the color printer 100A. The motor driver ICs 131, 133, and 134 are ICs that function similarly to the motor driver IC 132, and therefore the descriptions thereof will be omitted here. The motor driver IC 132 according to the present exemplary embodiment drives both the DC motors BM-1 and BM-2 in the monochrome printer 100B.

The motor driver IC 132 includes a control circuit 200 and two H-bridge circuit 201 and H-bridge circuit 202. The H-bridge circuit 201 includes four switches (for example, field-effect transistors) SW1, SW2, SW3, and SW4. The control circuit 200 outputs a control signal to each of the four switches SW1, SW2, SW3, and SW4. The switches SW1, SW2, SW3, and SW4 are turned on or off in response to the control signal. The H-bridge circuit 201 includes two power source terminal a and power source terminal b. The output a is output from the power source terminal a, and the output b is output from the power source terminal b.

When the DC motor BM-1 is driven, a voltage is applied to the two power source terminals a and b. The control circuit 200 turns on the switches SW1 and SW4 and turns off the switches SW2 and SW3 to connect (+) and (−) of a DC power source to the power source terminal a, which is one of the two power source terminals, and the power source terminal b, which is the other of the two power source terminals, respectively. Due to this connection, the DC motor BM-1 rotates in a forward direction. The control circuit 200 turns on the switches SW2 and SW3 and turns off the switches SW1 and SW4 to connect (−) and (+) of the DC power source to the power source terminal a, which is one of the two power source terminals, and the power source terminal b, which is the other of the two power source terminals, respectively. Due to this connection, the DC motor BM-1 rotates in a reverse direction. When the switches SW1 and SW3 are turned off and the switches SW2 and SW4 are turned on, the motor is stopped. The DC motors BM-1 and BM-2 according to the present exemplary embodiment rotate only in the forward direction and do not rotate in the reverse direction.

When the DC motor BM-2 is driven, a voltage is applied to two power source terminals c and b of the H-bridge circuit 202. The output c is output from the power source terminal c, and the output d is output from the power source terminal d. The H-bridge circuit 202 is configured similarly to the H-bridge circuit 201, and therefore the description thereof will be omitted here.

When the stepping motor STM-2 is driven, the two H-bridge circuits 201 and 202 are used. Generally, a two-phase stepping motor includes four systems of coils A, B, A*, and B*. The power source terminals a and b of the H-bridge circuit 201 correspond to the coils A and A*, respectively, and the power source terminals c and d of the H-bridge circuit 202 correspond to the coils B and B*, respectively. The stepping motor STM-2 is driven by changing the direction of an electric current supplied to the coil in a stepwise manner.

The locks of the two DC motors BM-1 and BM-2 installed in the monochrome printer 100B can be detected by forming the wires P25 and P26 on the printer control board 13B in advance as described above.

In the monochrome printer 100B, the intersection of wire rods in the wire harness can be prevented by inputting the output a, the output b, the output c, and the output d fed from one motor driver IC while sorting them into the two connectors 136A and 136B. In the color printer 100A, the occurrence of internal emptiness in one connector can be prevented by inputting the output a, the output b, the output c, and the output d fed from one motor driver IC while sorting them into the two connectors 136A and 136B.

<Exemplary Modifications>

The above-described exemplary embodiment has been described referring to the printer by way of example, but the board according to the present exemplary embodiment may be applied to an electronic apparatus such as a personal computer and a server.

The above-described exemplary embodiment has been described referring to the stepping motor that drives the development device, but the stepping motor may be a stepping motor that drives another actuator such as a photosensitive member.

Figure 9:
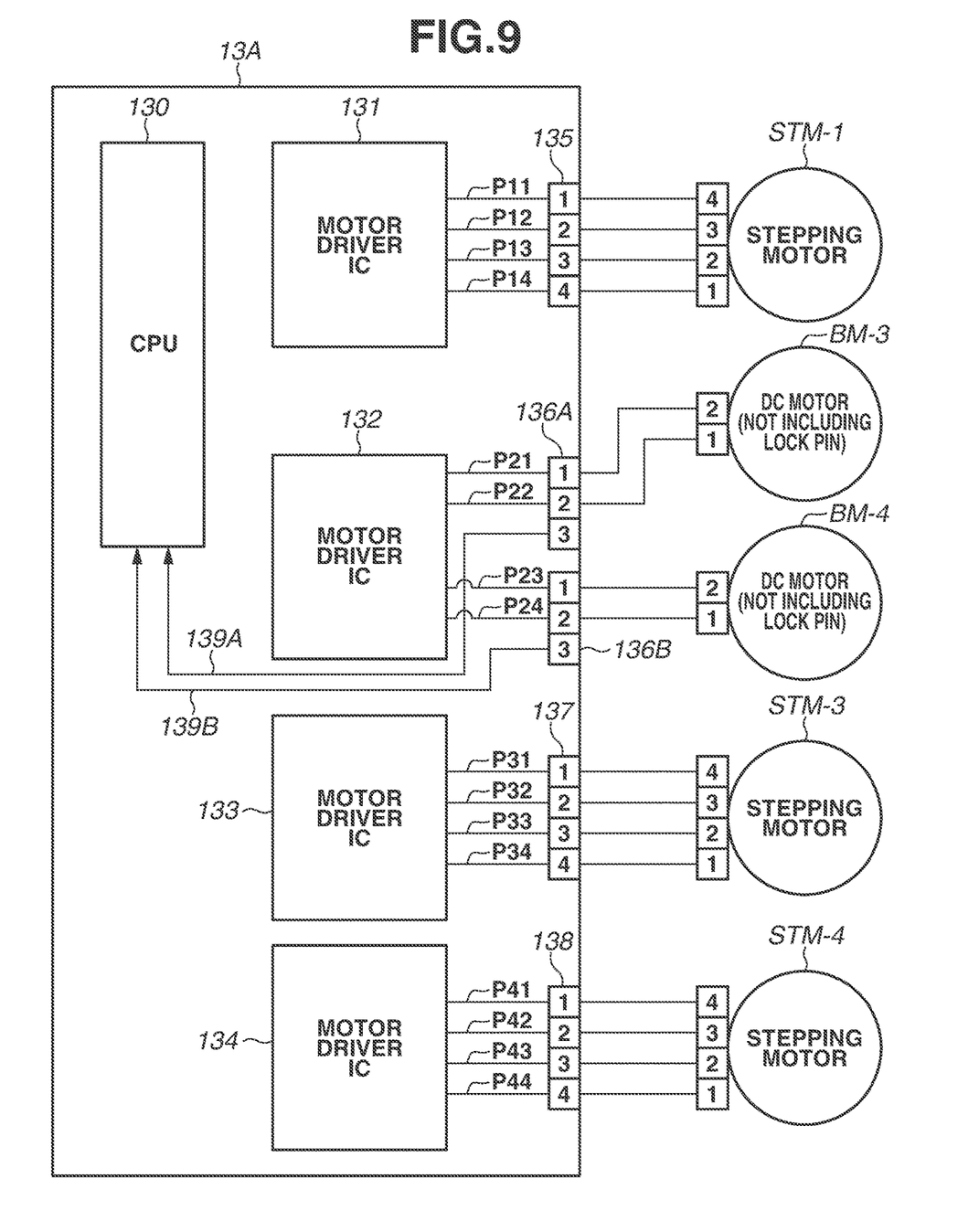
FIG. 9 illustrates details of a printer control board according to an exemplary modification.

The above-described exemplary embodiment has been described referring to the board capable of controlling the stepping motor, but two DC motors may be controlled instead of the stepping motor STM-2 as illustrated in FIG. 9. In other words, the printer control board is a board capable of controlling both two DC motors and two DC motors including LOCK pins.

Both the wires P25 and P26 are formed on the printer control boards 13A and 13B, but the formed wire may be any one of them.

The connector 135 and the connector 136A are disposed apart from each other, but the connector 135 and the connector 136A may be provided as one connector. The connector 137 and the connector 136B are disposed apart from each other, but the connector 137 and the connector 136B may be provided as one connector.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-043456, filed Mar. 12, 2020, which is hereby incorporated by reference herein in its entirety.

What is claimed is:

1. A board comprising:
   a first connector;
   a second connector; and
   a first motor driver control circuit coupled to the first connector and the second connector and including a first H-bridge and a second H-bridge,
   wherein the first connector includes at least the following pins: a first pin to which a first output of the first H-bridge is input, a second pin to which a second output of the first H-bridge is input, and a third pin of the first connector,
   wherein the second connector includes at least the following pins: a first pin to which a first output of the second H-bridge is input, a second pin to which a second output of the second H-bridge is input, and a third pin of the second connector,
   wherein the first connector and the second connector are deposed apart from each other in such a way that (i) intersection of wire rods within a wire harness connected between an external motor and the first connector is prevented, and
   wherein the first connector and the second connector further are deposed apart from each other in such a way that (ii) wire rods in a wire harness connected between an external motor on one end and the first connector and the second connector on the other end are connected contiguously to the pins in the first and second connectors whereby engagement weakness from an internally empty state is prevented.

2. The board according to claim 1, further comprising a wire, wherein the wire is a wire connected to the third pin of the first connector, or is a wire connected to the third pin of the second connector.

3. The board according to claim 2, further comprising a processor, wherein the wire is connected to the processor.

4. The board according to claim 2,
   wherein the first motor driver control circuit is a motor driver control circuit configured to drive a motor to output a lock signal, and
   wherein the wire transmits the lock signal output from the motor.

5. The board according to claim 1, further comprising both a wire connected to the third pin of the first connector and a wire connected to the third pin of the second connector.

6. The board according to claim 1,
   wherein the first motor driver control circuit is a motor driver control circuit configured to drive a stepping motor, and
   wherein a wire rod is not connected from the stepping motor to at least one of the following: the third pin of the first connector or the third pin of the second connector.

7. The board according to claim 1, further comprising a second motor driver control circuit including a third H-bridge and a fourth H-bridge.

8. The board according to claim 7, further comprising a third connector to which an output from the second motor driver control circuit is input.

9. The board according to claim 7, wherein the first connector of the first motor driver control circuit includes a pin to which an output from the second motor driver control circuit is input.

10. The board according to claim 1, further comprising an unpopulated region,
wherein the unpopulated region is configured so that a third motor driver control circuit, different from the first motor driver control circuit, is mountable, and
wherein at least four wires extending from the unpopulated region are formed in the board.

11. An electronic apparatus comprising:
a board having a first connector and a second connector;
a stepping motor; and
a motor connector,
wherein a wire rod, connected to the first connector, and a wire rod, connected to the second connector, are connected to the motor connector,
wherein the board further includes a first motor driver control circuit coupled to the first connector and the second connector and including a first H-bridge and a second H-bridge,
wherein the first connector includes at least the following pins: a first pin to which a first output of the first H-bridge is input, a second pin to which a second output of the first H-bridge is input, and a third pin of the first connector,
wherein the second connector includes at least the following pins: a first pin to which a first output of the second H-bridge is input, a second pin to which a second output of the second H-bridge is input, and a third pin of the second connector,
wherein the first connector and the second connector are deposed apart from each other in such a way that (i) intersection of wire rods within a wire harness connected between an external motor and the first connector is prevented, and
wherein the first connector and the second connector further are deposed apart from each other in such a way that (ii) wire rods with a wire harness connected between an external motor on one end and the first connector and the second connector on the other end are connected contiguously to the pins in the first and second connectors whereby engagement weakness from an internally empty state is prevented.

12. The electronic apparatus according to claim 11, wherein the stepping motor is a motor configured to drive a development device of a printer.

13. An electronic apparatus comprising:
a board having a first connector and a second connector;
a first direct-current (DC) motor;
a second DC motor;
at least the following: three wire rods connected to a connector of the first DC motor and the first connector; and
at least the following: three wire rods connected to a connector of the second DC motor and the second connector,
wherein the board further includes a first motor driver control circuit coupled to the first connector and the second connector and including a first H-bridge and a second H-bridge,
wherein the first connector includes at least the following pins: a first pin to which a first output of the first H-bridge is input, a second pin to which a second output of the first H-bridge is input, and a third pin of the first connector,
wherein the second connector includes at least the following pins: a first pin to which a first output of the second H-bridge is input, a second pin to which a second output of the second H-bridge is input, and a third pin of the second connector,
wherein the first connector and the second connector are deposed apart from each other in such a way that (i) intersection of wire rods within a wire harness connected between an external motor and the first connector is prevented, and
wherein the first connector and the second connector further are deposed apart from each other in such a way that (ii) wire rods with a wire harness connected between an external motor on one end and the first connector and the second connector on the other end are connected contiguously to the pins in the first and second connectors whereby engagement weakness from an internally empty state is prevented.

14. The electronic apparatus according to claim 13, wherein the first DC motor is a motor configured to drive a fan.

15. The board according to claim 1,
wherein the board is configured as a monochrome printer commonalized driver board having only two motor driver control circuits, three connectors, and two unpopulated regions, and
wherein each unpopulated region has wires on the board and is configured to receive a motor driver control circuit and a connector so that, on receipt of the two additional motor driver control circuits and the two additional connectors, the board now is configured as a color printer driver board.

16. A commonalized driver board to control a stepping motor and a direct-current motor in a monochrome printer, and to control multiple stepping motors in a color printer, the commonalized driver board comprising:
a first motor driver control circuit and a first connector, wherein the first connector is connected to the first motor driver control circuit via wires and has four pins;
a second motor driver control circuit and a second connector, wherein second connector is connected to the second motor driver control circuit via wires and has six pins arranged among a first three pin connector and a second three pin connector,
wherein the second connector is configured to be connected by a wire harness to the direct-current motor or to the stepping motor, and
wherein the first three pin connector and the second three pin connector are deposed apart from each other in such a way that (i) intersection of wire rods within a wire harness connected between the direct-current motor and the first three pin connector is prevented, and (ii) wire rods with a wire harness connected between the stepping motor on one end and the first three pin connector and the second three pin connector on the other end are connected contiguously to the pins in each three pin connector whereby engagement weakness from an internally empty state is prevented.

17. The commonalized driver board according to claim 16, wherein the first motor driver control circuit includes a first H-bridge and a second H-bridge and the second motor driver control circuit includes a third H-bridge and a fourth H-bridge.

18. The commonalized driver board according to claim 16, further comprising an unpopulated region,
wherein the unpopulated region is configured so that a third motor driver control circuit, different from the first motor driver control circuit, is mountable, and
wherein at least four wires extending from the unpopulated region are formed in the board.

19. The commonalized driver board according to claim 16, wherein the stepping motor is a motor configured to drive a development device of a printer.

20. The commonalized driver board according to claim 16, wherein the direct-current motor is a motor configured to drive a fan.

* * * * *